3,056,330
SPECTROSCOPIC APPARATUS
Jason L. Saunderson, Lexington, and Gerald Altman, Newton Center, Mass., assignors to Baird-Atomic, Inc., Cambridge, Mass., a corporation of Massachusetts
Filed Feb. 18, 1960, Ser. No. 9,618
5 Claims. (Cl. 88—14)

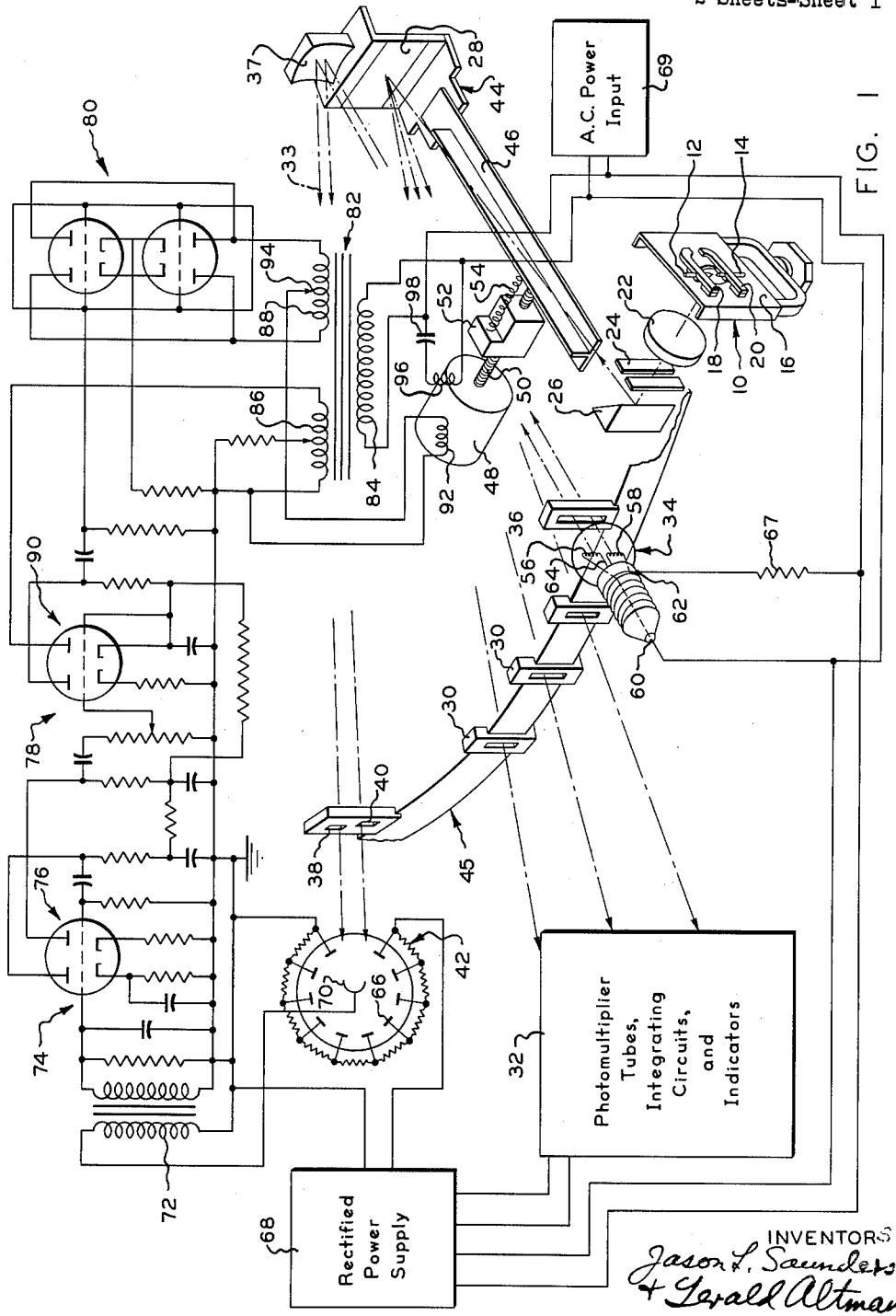

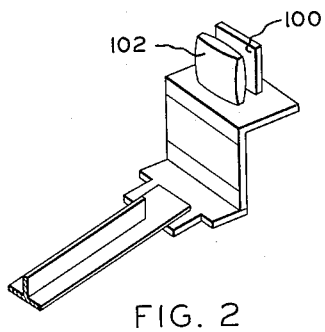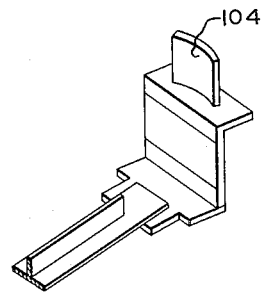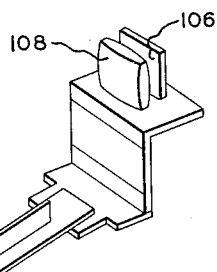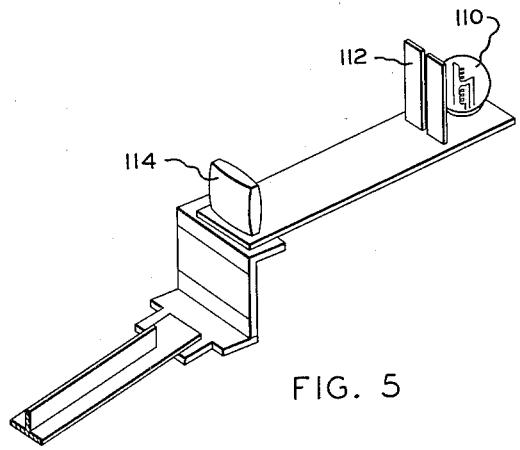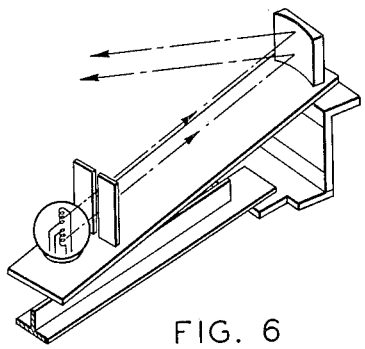

The present invention relates to spectrum analysis and, more particularly, to spectrometers of the so-called "direct reading" type, which automatically indicate the chemical composition of a specimen by determining the intensity distribution of radiation of characteristic wavelengths emitted by the specimen under excitation.

By way of example, a typical direct reading spectrometer comprises an entrance slit that transmits radiation from an electrically excited specimen, a diffraction grating that forms a spectrum from radiation so transmitted, and a plurality of exit slits that transmit radiation of preselected wavelengths to photocells in order to determine the differing intensities of the radiation at these wavelengths. In such a spectrometer, the spacial relationships among the entrance slits, the grating and the exit slits are so critical that minor change in ambient temperature, for example, may cause their misalignment and, in consequence, a spectrum shift capable of introducing errors into the determination of intensities.

It has been proposed that the automatic correction of any such misalignment be effected by an automatic servo system that is photoelectrically controlled by what may be termed "monitor radiation" from a source other than the excited sample. In accordance with the present invention, this monitor radiation is transmitted between auxiliary source and exit slits via an auxiliary optical component that is mechanically movable with the diffraction grating. The construction is such that after the design of the primary optical system has been completed and entrance and exit slits for the specimen radiation and the diffraction grating have been positioned in accordance therewith, the auxiliary components may be positioned at convenient remaining available locations without any interference whatsoever with the original design. The operation is such that misalignment among the grating and the entrance and exit slits for specimen radiation is accompanied by analogous misalignment among the auxiliary components.

Accordingly, the primary object of the present invention is to provide, in a spectrometer having components positioned at predetermined locations depending upon the chemical analysis for which the system is designed, a servo system of the foregoing type, in which correct relative orientation of the grating and the exit and entrance slits is maintained with the aid of an auxiliary monitoring system having components that may be positioned at available convenient locations among the components of the spectrometer.

Other objects of the present invention will in part appear hereinafter.

The invention accordingly comprises the apparatus possessing the features, properties and relation of components that are exemplified in the following detailed disclosure, the scope of which will be indicated in the appended claims.

For a fuller understanding of the nature and objects of the present invention, reference should be had to the following detailed description taken in connection with the accompanying drawings wherein:

FIG. 1 is a partially schematic, partially perspective diagram of a system embodying the present invention; and FIGS. 2, 3, 4, 5 and 6 are perspective views of modifications of components the system of FIG. 1.

The mechanical components of the spectrometer of FIG. 1, in operation, are enclosed within a housing that shields its interior from ambient radiation capable of affecting the system now to be described. This system serves to indicate the chemical composition of a specimen by determining the intensity distribution, at selected wavelengths, of radiation emitted by the specimen under excitation in an arc mount assembly 10. In conventional fashion, arc mount assembly 10 comprises a pair of electrodes 12 and 14, for example, in the form of two pins composed of the specimen material. Electrodes 10 and 14 are retained in predetermined relative axial positions on a mount 16 by a pair of clamps 18 and 20. Associated with arc mount assembly 10 is a circuit not shown for generating a suitable voltage across the gap between the inner ends of electrodes 12 and 14 in order to produce an electrical discharge that is accompanied by the characteristic radiation from the specimen. The gap between the inner ends of electrodes 12 and 14 is imaged by a lens 22, a slit 24 and a mirror 26 toward a concave diffraction grating 28 in order to produce a spectrum. Preselected portions (which may be thought of loosely as preselected lines) of this spectrum are directed through respective exit slits 30 toward respective photomultiplier tubes, generally designated by 32. The intensities of these spectrum lines are indicated by these photomultiplier tubes in association with appropriate integrating circuits (not shown).

In order to minimize even slight disturbances of the spacial relationships among the various aforementioned components, they are mounted on a sturdy A-shaped frame of the type shown in Patent No. 2,937,561, which issued from patent application Ser. No. 611,497, filed on September 24, 1956 in the names of Jason L. Saunderson and Eliot DuBois for "Spectroscopic Apparatus." This frame has intersecting longitudinal legs and short cross pieces constructed from heavy gauge channel stock. Nevertheless, because of the relatively great distance between the grating at one end of this frame and the entrance and exit slits at the other end, small temperature changes tend to disorient the grating with respect to the entrance and exit slits. In accordance with the present invention, proper orientation is ensured by an automatic servo system now to be described.

This servo system is photoelectrically controlled by monitor radiation in the form of two beams of radiation that are produced by a gas discharge tube 34 possessing upper and lower alternately bright radiating regions. These two beams are directed through a slit 36 toward a concave mirror 37. Mirror 37 directs these beams back through slightly offset upper and lower exit slits 38 and 40 to a photomultiplier tube 42. Normally, the servo system is adjusted so that when the grating is properly oriented, the upper and lower beams as shown in dotted line are transmitted in equal intensity through slits 38 and 40, respectively. But when the grating becomes improperly oriented, more of one of the beams and less of the other are transmitted through their respective slits. For example, a slight disorientation of the grating might cause the upper and lower beams to move to the left, as viewed in the drawing, so that the intensity of the beam transmitted through the upper slit would be greater than the intensity of the beam transmitted through the lower slit. Here the resulting imbalance operates to reorient the grating by means of the circuit and mechanism to be described below in reference to FIG. 1.

The mechanical components of the servo system include a mount, generally designated by 44, which carries grating 28 in substantially fixed position with respect to slits 30. Control of the grating orientation about a vertical axis is exercised by an elongated lever 46, one end of which is secured to mount 44. Servo motor 48 drives a shaft 50 on which rides an internally threaded block 52. Block 52 rides along a keyway in one direction or the other in response to rotation of the shaft. A coil spring 54, connected between block 52 and lever 46, exerts a shock free force on lever 46. In order to maintain proper orientation of the grating, servo motor 48 is controlled by the servo circuit to be described below.

It will be observed that monitor radiation source 34, monitor entrance slit 36, monitor mirror 37 and monitor slits 38, 40 are elevated above the remainder of the system. By virtue of this arrangement monitor radiation source 34, monitor entrance slit 36 and monitor exit slits 38, 40 may be located at convenient locations irrespective of the positions of exit slits 30 and irrespective of the nature of the specimen radiation in such a way that the monitor radiation is completely excluded from the field of the specimen radiation.

The upper and lower filaments 56 and 58 of tube 34 are connected in series across a pair of terminals 60 and 62 and are centrally supported at their junction by a rod 64. An alternating current applied across the filaments in series produces instantaneous defferences in potential between the filaments. When, at any instant the difference is great enough, the mercury vapor breaks down to create an electron flow in parallel with the connection between the filament. This electron flow gives rise to cathode glow in the vicinity of the instantaneous cathode. Gas discharge tubes of various other designs may be alternatively employed; it being only necessary that their vapor pressure and mechanical construction are adjusted to give rise to two alternate sources of radiation when subjected to an appropriate alternating voltage. As shown, this alternating voltage is supplied through a ballast resistor 67 from a power supply 69.

The upper and lower beams of monitor radiation emitted by tube 34, as indicated by arrows 33, are directed through slit 36 to mirror 37 and back through offset slits 38 and 40, as indicated above. Since slits 38 and 40 are offset, there is one orientation of the beams at which the amount of radiation directed through the upper slit is exactly equal to the amount of radiation transmitted through the lower slit. If the beams are in any other orientation, either the radiation transmitted through the lower slit or the radiation transmitted through the upper slit will be greater in intensity. Photomultiplier tube 42 includes dynodes 66 under steady voltages applied by a rectified power supply 68 and a collector anode 70. In response to the two beams photomultiplier tube 42 generates a succession of electrical pulses which are equal in magnitude when the beams are properly oriented. Collector anode 70 is connected through an input transformer 72 to three amplifier stages 74, 76 and 78 and a push-pull power stage 80. These stages are energized by power supply 68 through a transformer 82 having a primary winding 84. A pair of secondary windings 86 and 88 supply, respectively, a rectifier stage 90 that polarizes amplifier stages 74, 76 and 78 and power stage 80. One winding 92 of servo motor 48, which is of the split phase induction type, is connected between an appropriate intermediate point 94 of a secondary winding 88 to ground. The other winding 96 is connected to power supply 68 through a capacitor 98 which shifts the wave form in winding 96 into a 90° out of phase relationship with respect to the wave form in winding 92.

The operation of the circuit is such that when the alternate pulses generated by photomultiplier tube 70 are equal in magnitude, the wave form in windings 92 and 96 will be a succession of pulses of equal amplitude, these pulses corresponding in time with the positive and negative half cycles of the input power wave form. The rotor of the motor is thereby subjected to successively equal and opposite forces with the result that it remains stationary. However, when the alternate pulses from photomultiplier tube 42 are unequal in magnitude, a similar inequality will exist in the wave form of winding 92 and the pulses of greater amplitude will correspond with either the positive or negative half cycles of the power input wave form. Because the wave form in winding 96 is 90° out of phase with respect to the power input wave form, the rotor of the said servo motor 48 will rotate. The direction of rotation will be determined by whether the pulse of greater amplitude in winding 92 coincides with the positive or negative half cycle of the power input wave form. This direction is determined by whether the beam transmitted through slit 38 or the beam transmitted through slit 40 is of greater intensity.

Modifications of certain elements of the servo system are shown in FIGS. 2 to 6. FIG. 2 shows a plane mirror 100 and a lens system 102 as replacing concave mirror 37 of FIG. 1. FIG. 3 shows a concave grating 104 as replacing concave mirror 37 of FIG. 1. FIG. 4 shows a plane grating 106 and a lens system 108 as replacing concave mirror 37 of FIG. 1. FIG. 5 discloses a gas discharge tube 110, a slit 112 and a lens system 114 as replacing tube 34, a slit 36 and mirror 37 of FIG. 1. And FIG. 6 discloses a gas discharge tube 116, a slit 118 and a mirror 120 as replacing tube 34, a slit 36 and mirror 37 of FIG. 1.

The present invention thus provides a simple but effective servo system for automatically controlling the orientation of a grating or the like with respect to input and output optical components spaced therefrom. Alternative system, similar in principle, include: a single entrance slit and a single exit slit associated with a pair of photomultiplier tubes or a single entrance slit illuminated by two out of phase lamps. Such modifications are shown in Patent No. 2,837,959, issued on June 10, 1958 in the names of Jason L. Saunderson and Eliot Du Bois for "Means for Aligning Spectroscopic Components."

Since certain changes may be made in the above disclosure without departing from the scope of the invention presented in the claims, it is intended that all matter contained in the above description or shown in the accompanying drawings shall be interpreted in an illustrative and not in a limiting sense.

What is claimed is:

1. Spectroscopic apparatus comprising source means for producing specimen radiation, source means for producing monitor radiation, entrance slit means for transmitting said specimen radiation along a path, entrance aperture means for transmitting said monitor radiation along a path, grating means disposed in said path from said entrance slit means for dispersing said specimen radiation into a spectrum, a plurality of exit slit means for transmitting selected components of said spectrum, selected geometrical relationships among said entrance slit means, said grating means and said plurality of exit slit means being predetermined, reading means for determining the intensities of said components of specimen radiation, servo means for varying said selected geometrical relationships among said entrance slit means, said grating means and said plurality of exit slit means, monitor detecting means for producing signals for application to said servo means, and optical orienting means for directing said monitor radiation from said path from said entrance aperture means to said monitor detecting means, said optical orienting means and said grating means being mechanically fixed with respect to each other.

2. The spectroscopic apparatus of claim 1 wherein said optical orienting means is a mirror.

3. The spectroscopic apparatus of claim 1 wherein said optical orienting means is a grating.

4. The spectroscopic apparatus of claim 1 wherein said optical orienting means includes a lens.

5. Spectroscopic apparatus comprising source means for producing specimen radiation, source means for producing monitor radiation, entrance slit means for transmitting said specimen radiation along a path, entrance aperture means for transmitting said monitor radiation along a path, grating means disposed in said path from said entrance slit means for dispersing said specimen radiation into a spectrum, a plurality of exit slit means for transmitting selected components of said spectrum, selected geometrical relationships among said entrance slit means, said grating means and said plurality of exit slit means being predetermined, reading means for determining the intensities of said components of speciment radiation, servo means for varying said selected geometrical relationships among said entrance slit means, said grating means and said plurality of exit slit means, monitor detecting means for producing signals for application to said servo means, and optical orienting means for directing said monitor radiation from said path from said entrance aperture means to said monitor detecting means, said optical orienting means being fixedly mounted on said grating means at the axis thereof, said entrance slit means, said grating means and said plurality of exit slit means being disposed substantially at a first level, said entrance aperture means for said monitor radiation, said optical orienting means and said monitor detecting means being disposed substantially at a second level.

References Cited in the file of this patent

UNITED STATES PATENTS 2,937,561   Saunderson et al. _____ May 24, 1960